United States Patent [19]

Mandel

[11] Patent Number: 4,475,662

[45] Date of Patent: Oct. 9, 1984

[54] TOROIDAL PRESSURE VESSEL OF COMPOUND MATERIAL

[75] Inventor: Goetz Mandel, Sauerlach, Fed. Rep. of Germany

[73] Assignee: Messerschmitt-Bölkow-Blohm GmbH, Fed. Rep. of Germany

[21] Appl. No.: 443,313

[22] Filed: Nov. 22, 1982

[30] Foreign Application Priority Data

Dec. 3, 1981 [DE] Fed. Rep. of Germany ....... 3147867

[51] Int. Cl.³ .................. B65D 6/02; B65D 90/04; B65D 88/02
[52] U.S. Cl. .................................... 220/3; 220/414; 242/4 B
[58] Field of Search ............... 220/3, 1 B, 413, 85 B; 138/30; 242/4 B, 4 BE; 156/95

[56] References Cited

U.S. PATENT DOCUMENTS

| | | | |
|---|---|---|---|
| 1,928,640 | 10/1933 | Boardman | 220/1 B |
| 2,280,501 | 4/1942 | Stephenson | 220/3 |
| 2,688,488 | 9/1954 | Crowley | 220/3 X |
| 3,047,191 | 7/1962 | Young | 220/3 X |
| 3,121,451 | 2/1964 | Schuerch | 220/3 X |
| 3,266,660 | 8/1966 | Ragettli | 220/414 |
| 3,969,812 | 7/1976 | Beck | 220/3 X |
| 4,318,491 | 3/1982 | Nelson et al. | 220/3 X |

Primary Examiner—Stephen Marcus
Assistant Examiner—Robert Petrik
Attorney, Agent, or Firm—McGlew and Tuttle

[57] ABSTRACT

A pressure vessel has an inner core which is gastight or liquid tight. The core has an inner toroidal shape and an outer cylindrical contour. A first plurality of filament windings is wrapped in a meridian direction around the core to establish constant tangential and meridional stresses on the core and to back-up the core, the filaments having constant filament tension. An additional plurality of filament windings is wrapped equatorially on the vessel around the cylindrical contour for further backing-up the vessel. In the cylindrical contour area of the vessel equatorial and meridional filaments back-up the vessel while, in the inner toroidal shaped portion of the vessel, only the filaments in the meridian direction extend.

10 Claims, 4 Drawing Figures

TOROIDAL PRESSURE VESSEL OF COMPOUND MATERIAL

FIELD AND BACKGROUND OF THE INVENTION

The present invention relates in general to pressure vessels and in particular to a new and useful pressure vessel having a substantially toroidal shape with a cylindrical outer contour, the vessel having meridional and equatorial windings.

As a rule, pressure vessels of compound material, i.e. made of resin-impregnated glass fibers, carbon fibers, or the like, comprise a gastight or liquid tight inner tank which is armored or reinforced with a back-up winding of fibers, threads, or wires. This back-up winding removes lead from the inner tank, so that the total pressure forces acting on the vessel is taken up partly by the inner tank and partly by the back-up winding. In the following, such pressure vessels are termed optimal, if their contour has a meridional curvature at which the constant tangential and meridional stresses in the wall of the inner tank are equalized and, at the same time, the tensions of the elements in the back-up winding are kept constant. The equality of tangential and meridional stresses permits a full utilization of the load-carrying capacity of the employed material of the inner tank.

To satisfy this stress condition in a non-wrapped inner vessel, spherical vessels and special toroidal zones having a non-constant curvature, must be provided. Such optimal vessels have a weight amounting to one and a half the weight of the maximum storable energy, i.e. the pressure multiplied by the volume and divided by the tearing length of the material used.

The tearing or breaking lengths of wires, threads, and fibers and particularly large. Thus the tearing or breaking lengths of structural elements for taking up stresses in a single direction, namely their longitudinal direction, are large. In producing a vessel by wrapping a core, optimal lightweight pressure vessels are obtained if the curvature of the meridian is chosen so as to have the effect of equalizing the stresses of the threads, fibers, or wires in geodesic extension at any location, so that the load carrying capacity of the filamentous material is fully utilized.

Vessel shapes satisfying this condition are the cylinder, and tubular vessels having a periodically varied diameter, as well as toroidal zones having a non-constant meridian curvature. The weight of such optimal lightweight wound vessels amounts to triple the maximum storable energy, referred to the breaking length of the material used.

In the case of a wound construction, an additional weight proportion, of course, goes to the binder used, such as a resin, for binding the threads together. This weight proportion is particularly high if the filament is reversed in direction near some polar zone (criss-cross winding), and particularly low if the filaments extend in parallel (such as if a winding perpendicular to the meridian is applied to a cylinder). On toroidal vessels, a criss-cross winding is not used.

While applying the winding or wrapping technique, two principal difficulties are to be overcome:

1. With any kind of winding, polar zones of the vessel must be taken into account. If the materials (simply termed filaments in the following) are wound in the meridian direction, all filaments passing the equator cross at the pole. Therefore, special additional structural elements, such as connections and covers, are needed for the polar zones. This problem does not arise with toroidal vessels.

2. Vessels which are only wound and do not contain any inner tank, are liquid tight and gastight only under relatively low pressures. For this reason, the vessel may be wound on a core which is then washed out and replaced by a rubber bag inflated through a filling connection. This, however, is not possible with toroidal pressure vessels. Another possibility is to wind the filaments on an inner tank which remains in the pressure vessel and forms the winding core and then serves as the sealing wall.

While using as inner tank as supporting core for the back-up winding, care must be taken to provide the same absolute extensions for the material of both the inner tank and the wound filaments, i.e. both these materials must have the same modulus of elasticity, that is, in both materials, the stress and the modulus of elasticity must have the same proportion. Consequently, in a regular case, only the breaking length of the filaments or the breaking length of the inner tank can fully be utilized. If it is desired, for example, to fully utilize the high strength of carbon fibers, it is not possible to utilize, at the same time, the high breaking length of the material used for the inner tank, such as titanium. For this reason, it is advisable to take up the maximum possible load proportion through the winding, and a corresponding only very small proportion through the inner tank.

Now, an optimal wrapping of optimal vessels may be obtained by providing a proper meridional curvature of the vessel ensuring that the back-up pressure exerted by the winding on the loaded inner vessel is not constant, independently of the radius of the vessel, but effects a certain non-uniform pressure distribution over the vessel radius, such that the chosen shape of the vessel is at the same time the best or optimal one for the non-uniformly loaded inner tank and optimal for the non-uniformly loaded outer winding. This combination of an inner tank and a back-up winding would have an entirely uniform extension in any direction and at any point. Both the material of the inner tank and the material of the winding are fully stressed to an extent to which the winding and the inner tank are capable of equal extension.

With a high load proportion taken up by the winding and a very small load proportion absorbed by the inner tank, the mentioned design leads to toroidal zones of non-constant meridional curvature, yet not to meridians closed in themselves. The design might also be applied to a tank in the form of a closed torus. The disadvantage of this tank which is optimal in itself is that the load distribution between the inner tank and the outer back-up winding sets limits to the design. For example, it is not possible to utilize the very high breaking length of carbon fibers beyond a certain degree, since then a substantial portion of the load is necessarily taken up by the inner tank.

SUMMARY OF THE INVENTION

The present invention is directed to a closed toroidal pressure tank which insures an optimal design of the tank while providing an optimal lightweight construction.

Accordingly, an object of the present invention is to provide a pressure vessel which is air or liquid tight and intended to contain liquid or gas under pressure.

A further object of the present invention is to provide a toroidal pressure vessel made of compound material which includes a gastight or liquid tight inner tank or core, back-up windings of filaments made of fibers, threads or wires, the back-up windings being applied to the inner core for relieving a wall of the inner core, the windings having a meridional curvature effecting an equalization of constant tangential and meridional stresses in the wall of the inner tank and, at the same time being at constant filament tension, the toroidal pressure vessel including an equatorial cylindrical zone on the outside thereof and further back-up windings extending on the cylindrical zone normal to the meridian direction of the vessel.

A still further object of the invention is to provide such a pressure vessel which is simple in design, rugged in construction and economical to manufacture.

The invention utilizes the properties, which are favorable in themselves, of a closed tank, but at the same time extends the possibilities in the design of pressure tanks by providing a cylindrical equatorial zone on the outer circumference of an otherwise toroidal vessel. The initial tangential stresses thereby caused in this zone are taken up by a simple additional circular winding which is normal to the meridional direction of the pressure tank.

In this way, an extremely lightweight tank is obtained fully utilizing the high breaking length and strength of the filamentous material with a small binder proportion, and having no heavy connections in the polar zones. Also, the problems of other tank designs having a filament concentration at the poles, are avoided in this design. The provided load bearing proportion of the outer back-up winding relative to that of the inner tank may be higher than in the prior art constructions, independently of the limitations mentioned in the foregoing.

A pressure tank of this kind might be manufactured by applying the winding technique alone, however, no inner tank, such as in the form of a rubber bag, could be inserted.

In a vessel comprising an inner tank, and a back-up winding, the simultaneously bearing inner tank, which is fully matched in extensibility, assumes the functions of a winding core and a seal. The inner tank bears a load proportion of about 20%, for example, of the total load, while the balance of 80% is taken up by the outer back-up winding.

The connections for filling and emptying and/or for handling the pressure tank may be provided, for example, on one or more reinforced spar elements which are placed between two adjacent meridians instead of the meridian or winding turns. It is also possible to arrange these connections at reinforcing eyes, advantageously in the zone of small winding density at the margin of the cylindrical equatorial zone, while deflecting the meridional winding at the outwardly projecting shoulders of these reinforcing eyes to criss-cross turns replacing the winding along the meridian in this zone. Another possibility is to provide reinforcing ears and laying the meridional winding past or around these ears.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
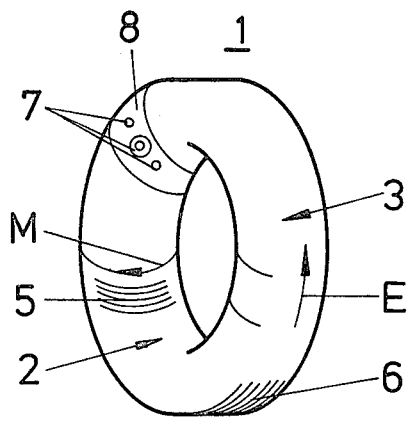
FIG. 1 is a perspective view of a toroidal pressure tank in accordance with the invention.

Referring to the drawings in particular, the invention embodied therein comprises, as shown in FIG. 1, a pressure vessel 1 having an inner toroidal shaped portion 2 and an outer cylindrical contour 3, the pressure vessel having connections 7 for filling, emptying, securing and handling the pressure vessel, which can be used for containing liquids or gases under pressure. The toroidal shaped portion 2 thus is curved in a radial cross-section, that is, a cross-section taken through a radial plane. Cylindrical contour 3 is straight and extends axially in radial cross-section.

Figure 2:
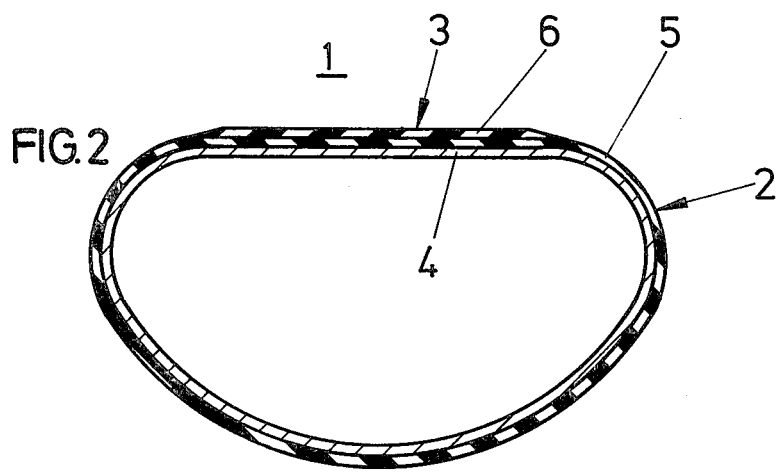
FIG. 2 is a sectional view of the pressure tank of FIG. 1 taken on a meridional plane.

On its sides and its inside, a toriodal pressure tank 1 has the shape of a closed torus 2, while in the equatorial zone it is formed as a cylindrical wall 3. The transition between these two zones is a jump in curvature as shown in FIG. 2. Pressure tank 1 comprises a lightweight inner tank 4 which also is toroidal. Applied to this inner tank are back-up windings 5 and 6, for example of carbon fibers which are held together by a resinous binder. Back-up winding 5 extends only in the meridional direction M (that is the direction lying in a radial plane of the core). On this meridional winding 5, a back-up winding 6 is applied in the zone of cylindrical wall 3, with the turns of this winding 6 extending in the equatorial direction, as indicated in FIG. 1 by arrow E.

The materials of the inner tank and the back-up winding are chosen to the effect of obtaining an identical absolute extension in both under the occurring loads. The inner tank is very lightweight (made of rubber for example) and must only have a strength substantially sufficient to make it suitable as the winding core for back-up windings 5 and 6.

In this pressure tank, the back-up pressure exerted by the windings 5 and 6 on loaded inner tank 4 is no longer independent of the radius of the tank. Rather a certain non-uniform pressure distribution is effected over the radius of the tank. The chosen shape of the vessel is optimal for the non-uniformly loaded inner tank, and so is this shape for the non-uniformly loaded outer back-up windings 5,6. In the purely toroidal zone 2, the advantages of closed toroidal tanks, as to the winding are utilized. In particular, no excessive concentration of turns with a high binder proportion occurs. The additional tangential stresses caused the cylindrical shape in the equatorial zone are taken up by the back-up winding 6 extending in the equatorial direction. Such a construction is very easy to make and exhibits a completely uniform extensibility in any direction and at any location. The tangentional and meridional stresses in the wall of the inner tank under load are constant, and so is the tension of the filaments in the back-up winding. The high breaking lengths of fibrous material such as carbon fibers, can be utilized in tanks of such shape to the optimum.

The pressure tank shown in FIG. 1 is provided with a plurality of connections 7, such as for securing or filling and emptying the vessel. These connections are provided on spar elements 8 which surround inner tank 4 and of which one is indicated in the figure. As a rule, one tank will be provided with one or two such elements. These spar elements which are reinforced as compared to back-up winding 5 replace this winding in the area between the two meridians bounding the spar element, and are usually themselves designed as wound bodies within the array of the back-up winding. It is also possible to make them up of a mat material or the like. The connections 7 are properly worked into spar elements 8.

Figure 3:
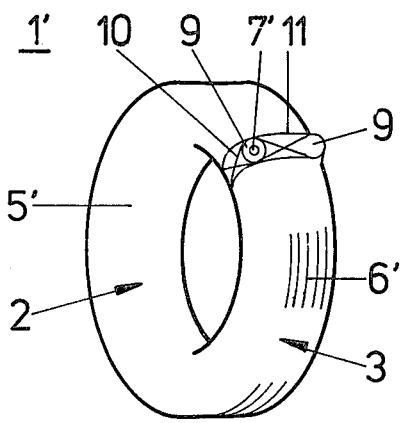
FIG. 3 is a perspective view of another embodiment of the inventive tank.

FIG. 3 shows a toroidal pressure vessel 1' which is identical with that of FIG. 1, with the exception of the areas receiving connections 7'. Again the toroidal pressure vessel comprises an inner tank to which a back-up winding 5' in the meridional direction M, and a back-up winding 6' in the cylindrical zone 3 and in the equatorial direction are applied. Connections 7' are provided in the zones of low winding density, i.e. in the marginal zones between back-up winding 5' and back-up winding 6', and a reinforcing eye 9 is inserted at either of these locations. Back-up winding 5' which otherwise extends in the meridional direction M, is here deflected in the area between the two connections 7' about the outwardly projecting shoulders of the reinforcing eyes 9, to form a criss-cross winding 10 replacing the winding 5' along the meridian in the receiving zone 11 for the reinforcing eyes and the connections.

Figure 4:
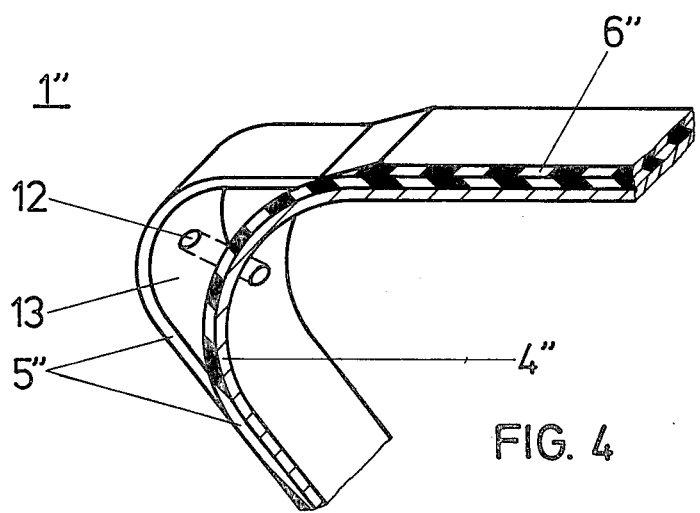
FIG. 4 is a perspective partial sectional view of a pressure tank, showing the position of the connections for filling, emptying, and handling the tank.

FIG. 4 shows a portion of a pressure vessel 1" in another embodiment, comprising a toroidal inner tank 4" having its equatorial zone designed as a circumferential cylindrical wall. Inner tank 4" is provided with a back-up winding 5" in the meridional direction, and a back-up winding 6" in its equatorial zone and equatorial direction. To secure connections, such as the filling opening 12 indicated in the figure, a reinforcing tube portion 13 is placed on inner tank 4" in the transitional zone between the torus and the cylinder, in which the respective connection is received and which is located between respective two adjacent meridians and is wound in place by the filaments of the meridional back-up winding 5". Tube portions 13 may be pieces of light metal, such as aluminum or the like provided with corresponding bores.

While specific embodiments of the invention have been shown and described in detail to illustrate the application of the principles of the invention, it will be understood that the invention may be embodied otherwise without departing from such principles.

What is claimed is:

1. A pressure vessel comprising:

an inner core defining a sealed vessel space which has a toroidal shape (2) which has an inner wall curved in radial cross-section and has an outer wall of cylindrical contour (3) and is axially straight in radial cross-section;
a first plurality of filament windings extending in a meridian direction on said core which lies within radial planes of said core for equalizing constant tangential and meridional stresses of said core with constant filament tension in said first plurality of filament windings; and
a second plurality of filament windings on said outer cylindrical contour extending substantially normally to the meridian direction and equitorially of said cylindrical contour.

2. A pressure vessel according to claim 1, including at least one reinforcing ear located between two of said first plurality of filament windings, said at least one reinforcing ear being wound by at least one of said first plurality of filament windings, said at least one ear connected to said core in a marginal zone between said toroidal shaped portion and said outer cylindrical contour.

3. A pressure vessel according to claim 1, wherein filament windings extend on said inner toroidal shaped portion only in the meridian direction, filaments on said outer cylindrical contour extending both in the meridian direction and perpendicularly to the meridian direction.

4. A pressure vessel according to claim 1, including a reinforced spar extending in the meridian direction on said core, and at least one connection connected to said spar for one of filling, emptying, securing and handling the pressure vessel.

5. A pressure vessel according to claim 4, wherein none of said first plurality of filament windings extend in the area of said spar, said spar positioned between two adjacent ones of said first plurality of filament windings.

6. A pressure vessel according to claim 1, including at least two reinforcing eyes connected to a radially an outwardly projecting shoulder extending in an axial direction, at least one of said first plurality of filament windings extending over said shoulder.

7. A pressure vessel according to claim 6, wherein at least two of said first plurality of filament windings extend over said shoulder in criss-cross direction.

8. A pressure vessel according to claim 6, including a connection connected to at least one of said reinforcing eyes, said connection adapted for one of filling, emptying, securing and handling the pressure vessel.

9. A pressure vessel according to claim 6, wherein a density of filament windings in said marginal area is low.

10. A pressure vessel according to claim 2, wherein a density of filament windings in said marginal area is low.

* * * * *